United States Patent
Sharma et al.

(10) Patent No.: US 10,552,383 B2
(45) Date of Patent: Feb. 4, 2020

(54) METHOD AND SYSTEM FOR DATA CONVERSION AND DATA MODEL OPTIMIZATION

(71) Applicant: Wipro Limited, Bangalore (IN)

(72) Inventors: Mayank Sharma, Bangalore (IN); Buland Khan, Navi Mumbai (IN)

(73) Assignee: Wipro Limited, Bangalore (IN)

( * ) Notice: Subject to any disclaimer, the term of this patent is extended or adjusted under 35 U.S.C. 154(b) by 288 days.

(21) Appl. No.: 15/714,681

(22) Filed: Sep. 25, 2017

(65) Prior Publication Data

US 2019/0050400 A1 Feb. 14, 2019

(30) Foreign Application Priority Data

Aug. 11, 2017 (IN) .............................. 201741028578

(51) Int. Cl.
*G06F 16/00* (2019.01)
*G06F 16/178* (2019.01)

(52) U.S. Cl.
CPC ................................ *G06F 16/1794* (2019.01)

(58) Field of Classification Search
CPC ... G06F 16/1794; G06F 16/258; H04L 9/0637
See application file for complete search history.

(56) References Cited

U.S. PATENT DOCUMENTS

| | | | |
|---|---|---|---|
| 6,477,510 B1 * | 11/2002 | Johnson | G06Q 40/02 705/30 |
| 6,704,747 B1 | 3/2004 | Fong | |
| 6,996,589 B1 | 2/2006 | Jayaram et al. | |
| 7,580,970 B2 | 8/2009 | Bank et al. | |
| 8,595,616 B2 * | 11/2013 | Wall | G06F 16/258 715/249 |
| 2007/0179983 A1 | 8/2007 | Putman | |
| 2014/0143761 A1 * | 5/2014 | Fridman | G06F 8/51 717/137 |
| 2015/0193243 A1 | 7/2015 | Varkhedi et al. | |

(Continued)

FOREIGN PATENT DOCUMENTS

DE        102012202603 B3        7/2013

*Primary Examiner* — Cheryl Lewis
(74) *Attorney, Agent, or Firm* — Pepper Hamilton LLP

(57) ABSTRACT

Embodiments of present disclosure discloses system and method for conversion of structured database into unstructured database. Initially, structured database and database descriptor is retrieved in distributed environment. Structured database comprises data fields, and each of the data fields corresponds to financial transaction. Optimized target data model is generated for storing data in the unstructured database, based on at least one of database objects extracted from data fields of structured database, and pre-defined conversion rules. Further, a Blockchain comprising blocks corresponding to each financial transaction of structured database. Each of the blocks comprise at least one of extracted database object. Conversion of the database object of each of the blocks into data fields of unstructured database is performed based on optimized target data model and notification corresponding to data fields of unstructured database is generated which are associated with discrepancies corresponding to the financial transaction.

21 Claims, 5 Drawing Sheets

(56) References Cited

U.S. PATENT DOCUMENTS

| | | | |
|---|---|---|---|
| 2015/0363769 A1* | 12/2015 | Ronca | G06Q 20/381 |
| | | | 705/64 |
| 2016/0328706 A1* | 11/2016 | Kennedy | G06Q 20/381 |
| 2016/0342994 A1 | 11/2016 | Davis et al. | |
| 2017/0236121 A1* | 8/2017 | Lyons | G06Q 20/102 |
| | | | 705/71 |
| 2017/0270493 A1* | 9/2017 | Lugli | G06Q 20/027 |
| 2018/0253702 A1* | 9/2018 | Dowding | G06Q 20/06 |

\* cited by examiner

METHOD AND SYSTEM FOR DATA CONVERSION AND DATA MODEL OPTIMIZATION

This application claims the benefit of Indian Patent Application Serial No. 201741028578 filed Aug. 11, 2017, which is hereby incorporated by reference in its entirety.

FIELD

The present subject matter is related in general to the field of modernization of databases, more particularly, but not exclusively to a system and method for conversion of a structured database into an unstructured database.

BACKGROUND

Legacy systems, including legacy databases, implemented in one or more entities are highly valuable and critical to the entities that may correspond to banks or other financial setups. The one or more entities may reach a state where one or more factors may limit ability of the legacy systems to evolve and quickly respond to changing business requirements. Some of the bank entities mainly function on legacy databases which comprise of records and data associated with customers, transactions, policies and so on. Legacy systems of such bank entities range from mainframe technology to custom applications and other applications which lack accessible interfaces and are not intended to deal with rapidly increasing mobile services. Sometimes such legacy databases have inability to offer capabilities necessary for services on social networks and other platforms to the customers. Also, the legacy system may not meet current demands associated with mobile technologies, cloud computing, big data and so on.

Further, in such bank entities, when monthly bank statements are to be generated, there may exist discrepancies in financial transactions of the consumers. The discrepancies may include big size credit or debit transaction based on spending history, incomplete transaction, new beneficiary transfer, duplicate transactions, unauthorized transactions, difference in transaction amount like missing money or extra amount of money, unintentional mistakes like data errors, software issues, late payments, shrinkage and the like. For the aforementioned cases, identifying the discrepancies in the bank statements by bank reconciliation may be complex and time consuming if the records are maintained in legacy databases.

Techniques to deal with the legacy databases include middleware solutions which include creating new data store and uploading records or data of the legacy database onto a new data store. This provision allows for easy sharing of the records or the data with other systems and applications. However, the middleware solutions may be a temporary solution and undetected flaws in the uploading may result in unacceptable amounts of data loss. Also, replacement of the legacy database with modern technology databases may not be economical and are time consuming. Further, since the legacy systems have high reliability on the mainframe to host and process massive amount of data across industries, replacing the legacy systems encompasses fear of disruption or failure.

Need for modernization of the legacy systems has given rise to plurality of modernization techniques which are implemented on the legacy systems. However, none of the modernization techniques deal with the discrepancies in entries of the legacy databases. Along with the modernization of the legacy databases, a need for identifying the discrepancies in the modernized database also exists.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for conversion of a structured database into an unstructured database. The method includes retrieving, in a distributed environment, structured database and a corresponding database descriptor. The structured database comprises one or more data fields, and each of the one or more data fields corresponds to a financial transaction from one or more financial transactions. The method further includes generating an optimized target data model for storing data in the unstructured database, based on at least one of a plurality of database objects extracted from one or more data fields of the structured database, and a set of pre-defined conversion rules. Further, a Blockchain comprising one or more blocks corresponding to each of the one or more financial transactions of the structured database is generated. Each of the one or more blocks comprise at least a database object from the plurality of database objects. Conversion of the database object of each of the one or more blocks into one or more data fields of the unstructured database is performed based on the optimized target data model and a notification corresponding to the one or more data fields of the unstructured database is generated which are associated with one or more discrepancies corresponding to the financial transaction.

In an embodiment, the present disclosure relates to a database conversion system for conversion of a structured database into an unstructured database. The database conversion system includes a processor and a memory communicatively coupled to the processor. The memory stores processor-executable instructions which on execution cause the processor to initially retrieve, in a distributed environment, structured database and a corresponding database descriptor. The structured database comprises one or more data fields, and each of the one or more data fields corresponds to a financial transaction from one or more financial transactions. An optimized target data model is generated for storing data in the unstructured database. The generation is based on at least one of a plurality of database objects extracted from one or more data fields of the structured database, and a set of pre-defined conversion rules. Further, a Blockchain comprising one or more blocks corresponding to each of the one or more financial transactions of the structured database is generated. Each of the one or more blocks comprise at least a database object from the plurality of database objects. Conversion of the database object of each of the one or more blocks into one or more data fields of the unstructured database is performed based on the optimized target data model and a notification corresponding to the one or more data fields of the unstructured database is generated which are associated with one or more discrepancies corresponding to the financial transaction.

In an embodiment, the present disclosure relates to a non-transitory computer readable medium including instructions stored thereon that when processed by at least one processor cause a device to perform operations comprising, initially retrieving, in a distributed environment, structured database and a corresponding database descriptor. The structured database comprises one or more data fields, and each of the one or more data fields corresponds to a financial transaction from one or more financial transactions. The method further includes generating an optimized target data model for storing data in the unstructured database, based on at least one of a plurality of database objects extracted from one or more data fields of the structured database, and a set of pre-defined conversion rules. Further, a Blockchain comprising one or more blocks corresponding to each of the one or more financial transactions of the structured database is generated. Each of the one or more blocks comprise at least a database object from the plurality of database objects. Conversion of the database object of each of the one or more blocks into one or more data fields of the unstructured database is performed based on the optimized target data model and a notification corresponding to the one or more data fields of the unstructured database is generated which are associated with one or more discrepancies corresponding to the financial transaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
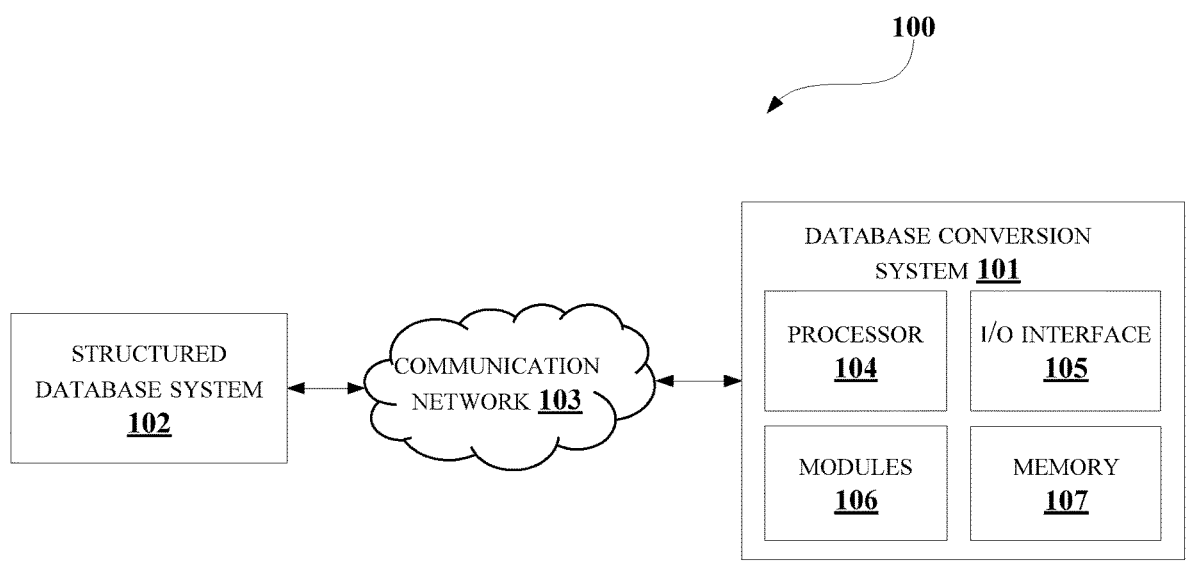
FIG. 1 illustrates an exemplary environment for conversion of a structured database into an unstructured database in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure discloses a method and a system to convert a legacy database (which may be a structured database) to modern database (which may be an unstructured database) with lesser cost of resource and storage associated with modernization of the legacy database. Also, the present disclosure discloses to identify one or more discrepancies in financial transactions of the structured database and notifying the one or more discrepancies in the unstructured database, thereby provides a faster way of addressing discrepancies in the financial transactions. The structured database which is to be converted is initially retrieved in a distributed environment, along with a corresponding database descriptor. The structured database comprises one or more data fields which correspond to a financial transaction from one or more financial transactions in the structured database. A target data model is generated for storing data in the unstructured database, based on at least one of a plurality of database objects which are extracted from the one or more data fields of the structured database, and a set of pre-defined conversion rules. By this, the present disclosure provides an optimized and efficient target data model. A Blockchain comprising one or more blocks corresponding to each of the one or more financial transactions of the structured database. Each of the one or more blocks comprise at least a database object from the plurality of database objects. Conversion of the database object of each of the one or more blocks into one or more data fields of the unstructured database is performed based on the optimized target data model and a notification, associated with one or more discrepancies corresponding to the financial transaction, is generated for corresponding one or more data fields of the unstructured database.

FIG. 1 illustrates an exemplary environment 100 for conversion of the structured database into the unstructured database in accordance with some embodiments of the present disclosure. The exemplary environment 100 comprises a database conversion system 101, a structured database system 102 and a communication network 103. The database conversion system 101 is configured to convert the structured database into the unstructured database. The structured database system 102 may be a legacy system, associated with a bank entity, comprising the structured database and a corresponding database descriptor. The database conversion system 101 communicates with the structured database system 102 via the communication network 103 for retrieving and providing data which is associated with the conversion of the structured database to the unstructured database. In an embodiment, the communication network 103 may include, without limitation, a direct interconnection, Local Area Network (LAN), Wide Area Network (WAN), wireless network (e.g., using Wireless Application Protocol), the Internet, and the like.

The data conversion system 101 includes a processor 104, I/O interface 105, one or more modules 106 and a memory 107. In some embodiments, the memory 107 may be communicatively coupled to the processor 104. The memory 107 stores processor executable instructions, which, on execution, may cause the database conversion system 101 to convert the structured database into the unstructured database. The database conversion system 101 may be implemented in a variety of computing systems, such as a laptop computer, a desktop computer, a Personal Computer (PC), a notebook, a smartphone, a tablet, e-book readers (e.g., Kindles and Nooks), a server, a network server, and the like.

For conversion of the structured database into the unstructured database, the database conversion system 101 is implemented in a distributed environment. In an embodiment, the distributed environment is set-up for exchanging, managing and computing data for conversion of the structured database to the unstructured database. In an embodiment, the distributed environment may be a non-mainframe environment. Examples for the distributed environment may include, but are not limited to, windows or Linux server, a cloud based development environment such as International Business Machines (IBM), Bluemix and the like. Initially, the database conversion system 101 retrieves the structured database and a corresponding database descriptor in the distributed environment. The structured database may be one of a Virtual Storage Access Method (VSAM) database, hierarchical database such as Information Management System (IMS), network database such as Integrated Database Management System (IDMS), relational database such as Database 2 (DB2). The structured database comprises one or more data fields, and each of the one or more data fields corresponds to a financial transaction from one or more financial transactions in the structured database. The financial transactions may be in form of records in the structured database for each customer associated with the bank entity. In an embodiment, each of the data fields in the structured database may comprise fields associated with the financial transaction. The fields may include, but are not limited to, "date of transaction", "time of transaction", "amount of transaction", "account details", "beneficiary details" and so on. In an embodiment, the database descriptor may comprise information associated with the structured database. The information may be used for opening and deciphering the structured database by the database conversion system 101.

Upon retrieving the structured database and the database descriptor, an optimized target data model is generated for storing data in the unstructured database. The optimized target data model may be generated based on at least one of a plurality of database objects and a set of pre-defined conversion rules. The plurality of database objects may be extracted from the one or more data fields of the structured database. In an embodiment, the plurality of database objects may be information present in each of the one or more data fields. For example, in the "date of transaction" field of the one or more data fields, the one or more database objects may be date of transaction. Similarly, in the amount of transaction field of the one or more data field, value of amount which was transacted may be the plurality of database objects. Extraction of the plurality of database objects may be based on parsing of the one or more data fields. In an embodiment, the parsing of the one or more data fields may include analysis of the plurality of database objects corresponding to the one or more data fields and translating the analyzed plurality of database objects to document-based data type. In an embodiment, the one or more database objects in the structured database may be a file-based data type. Storing and processing of the file-based data type may be in-efficient and may require multiple processing cycles. In an embodiment, the one or more database objects may be translated to document-based data type for conversion of the structured database to the unstructured database, by which the storage is reduced to fewer bytes and date functions may run over the document-based data type. One or more techniques known to a person skilled in art may be implemented for extracting the plurality of database objects from the one or more data fields.

Further, a Blockchain is generated by the database conversion system 101. The Blockchain comprises one or more blocks corresponding to each of the one or more financial transactions of the structured database. Each of the one or more blocks comprise at least a database object from the plurality of database objects extracted from the one or more data fields of the structured database. In an embodiment, a Blockchain technique may be implemented for generating the Blockchain in the present disclosure. The one or more blocks may be generated for corresponding one or more financial transactions that occur within a pre-determined time interval. The pre-determined time interval may be, but not limited to, daily, monthly, quarterly, yearly and so on. Consider the predefined time interval to be monthly, then each of the one or more blocks may be generated for the one or more financial transactions occurring for every month in a year. The one or more discrepancies are identified based on one or more pre-defined transaction patterns. In an embodiment, the one or more pre-defined transaction patterns are generated based on analysis of historic financial transaction data. The historic financial transaction data comprises past financial transactions in the structured database. The database conversion system 101 is configured to analyze the historic transaction data and generate the one or more predefined transaction patterns based on the analysis. In an embodiment, one or more techniques known to a person skilled in art may be implemented for generating the one or more predefined transaction patterns. In an embodiment, one or more discrepancy factors may be identified in the one or more pre-defined transaction pattern and the one or more discrepancies may be identified based on the one or more discrepancy factors. The one or more discrepancy factors may include, but are not limited to, unusual transaction, adding of new beneficiary, money transfer to new beneficiary, transaction from a new merchant location and the like.

Further, the database conversion system 101 performs the conversion of the database object of each of the one or more blocks of the Blockchain into one or more data fields of the unstructured database based on the optimized target data model. In an embodiment, the plurality of database objects extracted from the one or more data fields of the structured database are file-based data type and are stored in the one or more data fields of the unstructured database thereby performing the conversion.

Upon the conversion, the database conversion system 101 is further configured to generate a notification corresponding to the one or more data fields of the unstructured database, the notification is associated with one or more discrepancies corresponding to the financial transaction. In an embodiment, the notification comprises highlighting the one or more data fields associated with the one or more discrepancies in the unstructured database.

In an embodiment, the database conversion system 101 receives data from the structured database system 102 and other associated data for the conversion through the I/O interface 105 of the database conversion system 101. Also, the database conversion system 101 transmits data via the I/O interface 105. Further, the I/O interface 105 may be coupled with the processor 104 of the database conversion system 101.

Figure 2:
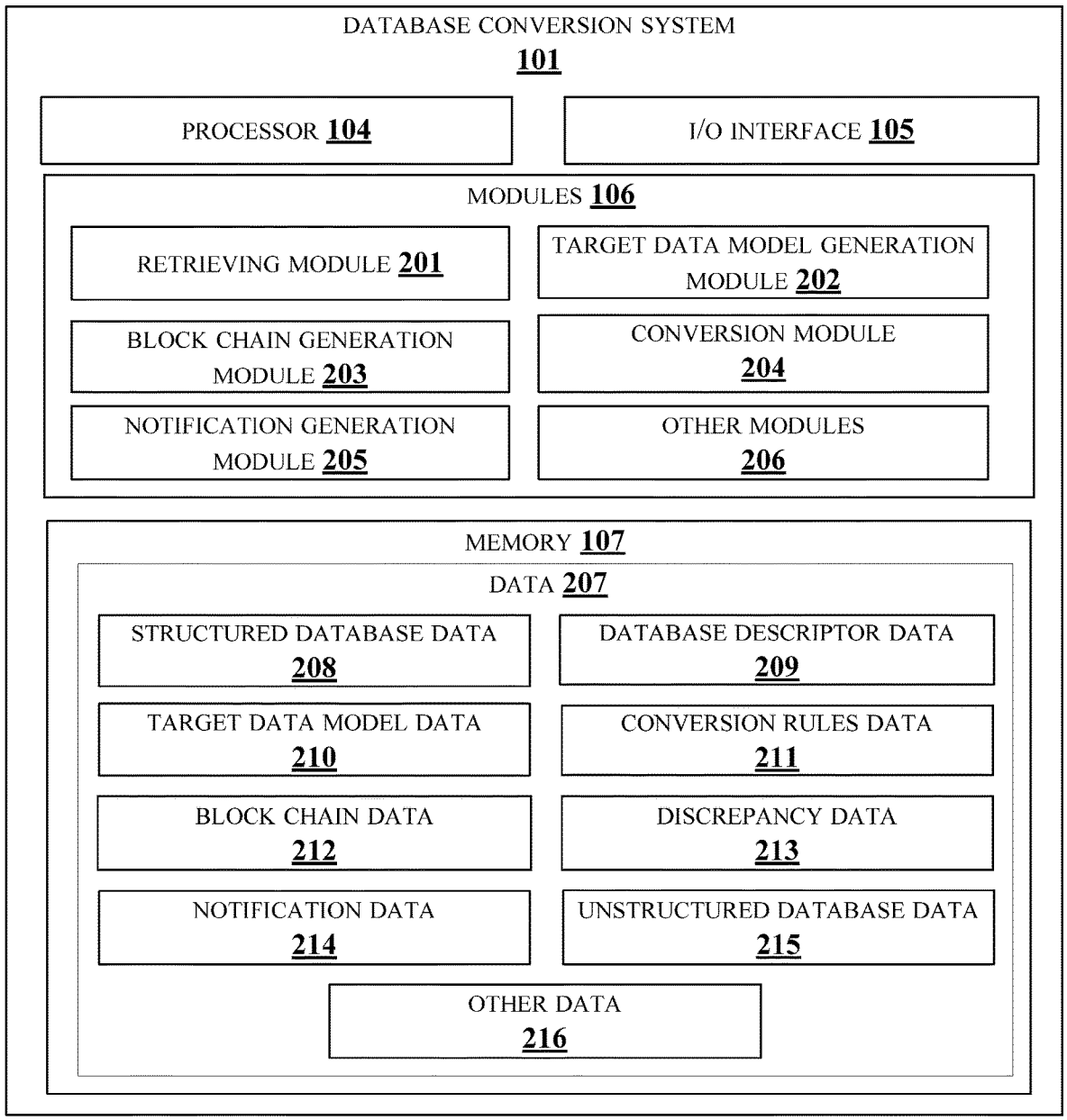
FIG. 2 shows a detailed block diagram of a database conversion system for conversion of a structured database into an unstructured database in accordance with some embodiments of the present disclosure.

FIG. 2 shows a detailed block diagram of the database conversion system 101 for conversion of a structured database into an unstructured database in accordance with some embodiments of the present disclosure.

The data 207 in the memory 107 and the one or more modules 106 of the database conversion system 101 may be described herein in detail.

In one implementation, the one or more modules 106 may include, but are not limited to, a retrieving module 201, a target data model generation module 202, a Blockchain generation module 203, a conversion module 204, a notification generation module 205 and one or more other modules 206 associated with the database conversion system 101.

In an embodiment, the data 207 in the memory 107 may include structured database data 208 (also referred as the structured database 208), database descriptor data 209 (also referred as the database descriptor 209), target data model data 210 (also referred as the optimized target data model 210 or the target data model 210), conversion rules data 211 (also referred as the predefined conversion rules 211 or the set of predefined conversion rules 211), Blockchain data 212 (also referred as the Blockchain 212), discrepancy data 213 (also referred as the one or more discrepancies 213), notification data 214 (also referred as the notification 214), unstructured database data 215 (also referred as the unstructured database 215) and other data 216 associated with the database conversion system 101.

In an embodiment, the data 207 in the memory 107 may be processed by the one or more modules 106 of the database conversion system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules when configured with the functionality defined in the present disclosure may result in a novel hardware.

The retrieving module 201 of the database conversion system 101, for conversion of the structured database 208 to the unstructured database 215 retrieves the structured database 208 and the database descriptor 209 in the distributed environment. The structured database 208 may be one of a VSAM database, hierarchical database such as Information Management System (IMS), network database such as Integrated Database Management System (IDMS), relational database such as Database 2 (DB2). The unstructured database 215 may be one of not only-Structured Query Language (noSQL) database, Mongo database (MongoDB), Apache Couch Database (CouchDB), IBM Cloudant Database, and the like. The structured database 208 comprises the one or more data fields, and each of the one or more data fields corresponds to a financial transaction from the one or more financial transactions in the structured database 208. In an embodiment, each of the one or more data fields in the structured database 208 may comprise fields associated with the financial transaction. The structured database 208 may comprise data in the one or more data fields as sequence of binary or hexadecimal characters and may not be in a readable format. In an embodiment, the database descriptor 209 is an interface between the database conversion system 101 and the structured database 208, to identify length of each of the one or more data fields in the structured database 208 and starting position of the corresponding data field. The database descriptor will help the database conversion system 101 to identify each of the plurality of database objects in the one or more data fields. In an embodiment, the MS-Cobol module may be implemented for deciphering the structured database 208.

Further, the plurality of database objects is extracted from the one or more data fields of the structured database 208. The plurality of database objects may be information present in each of the one or more data fields. In an embodiment, extraction of the plurality of database objects may be based on parsing of the one or more data fields using the database descriptor 209. In an embodiment, the parsing of the one or more data fields may include analysis of the plurality of database objects in corresponding one or more data fields and translating the analyzed database objects to document-based data type. In an embodiment, the one or more database objects in the structured database 208 may be a file-based data type. In an embodiment, the one or more database objects may be translated to document-based data type for conversion of the structured database 208 to the unstructured database 215. In an embodiment, the file-based data type may include, but are not limited to, alphanumeric data type, binary integer, floating-point fields, packed field and un-packed fields. In an embodiment, the document-based data type may include, but not limited to, string data type, Boolean data type, double Boolean data type, Date and the like.

Consider a VSAM database is to be converted to a MongoDB by the database conversion system 101. In this case, if the plurality of database objects in the VSAM database are of alphanumeric data type, the one or more database objects may be translated to document character data type. If the plurality of the database objects is binary integer data type, then the plurality of database objects may be translated to MongoDB integer or SMALLINT data types. In this process, two-byte binary integers (defined as S9(4) or smaller) correlate to SMALLINT, while four-byte binary integers (defined as S9(5) to S9(9)) correlate to MongoDB integer. If the plurality of the database objects is of floating-point data type, both single precision and double precision of the plurality of the database objects may be translated to MongoDB Integer (Float) data types. If the plurality of the database objects is of packed fields data type, these fields may be translated to integer datatype. For the packed fields data type, direct mapping of the plurality of the database objects is performed, except where the packed fields exceed 15 digits. In an embodiment, for the packed fields exceeding, the digits, data may be analyzed to determine whether full length is required for the translation. In an embodiment, if length of the plurality of the database objects is to ensure precision (for example, five decimal places for a monetary field), these fields can be redefined with normal precision for storage while using program work areas of greater precision for computation. If the plurality of the database objects is unpacked fields, the plurality of the database objects may be translated to one of character or decimal.

Consider Table 1 below illustrating the one or more data fields in the VSAM database with integer data type.

TABLE 1

| VSAM | | |
|---|---|---|
| BD-DD | Integer | 1 |
| BD-MT | Integer | 6 |
| BD-YR | Integer | 1992 |

In Table 1, the one or more data fields may be 'BD-DD' for date, 'BD-MT' for month and 'BD-YR' for year. The plurality of database objects for each of the one or more data fields are '1', '6' and '1992' respectively. When extracting the plurality of the database objects, the plurality of the database objects may be translated to date data type which is a document-based data type as shown in Table 2 below:

TABLE 2

| MongoDB | | |
|---|---|---|
| BD | Date | 1 Jun. 1992 |

Consider Table 3 below illustrating the one or more data fields in the VSAM database with character data type.

TABLE 3

| VSAM | | |
|---|---|---|
| MARRIED | CHAR (1) | Y |

In Table 3, the one or more data fields may be 'MARRIED' for status. The plurality of database objects for each of the one or more data fields is 'Y'. When extracting the plurality of the database objects, the plurality of the database objects may be translated to Boolean data type which is a document based data type as shown in Table 4 below:

TABLE 4

| MongoDB | | |
|---|---|---|
| MARRIED | Boolean | TRUE |

Figure 3:
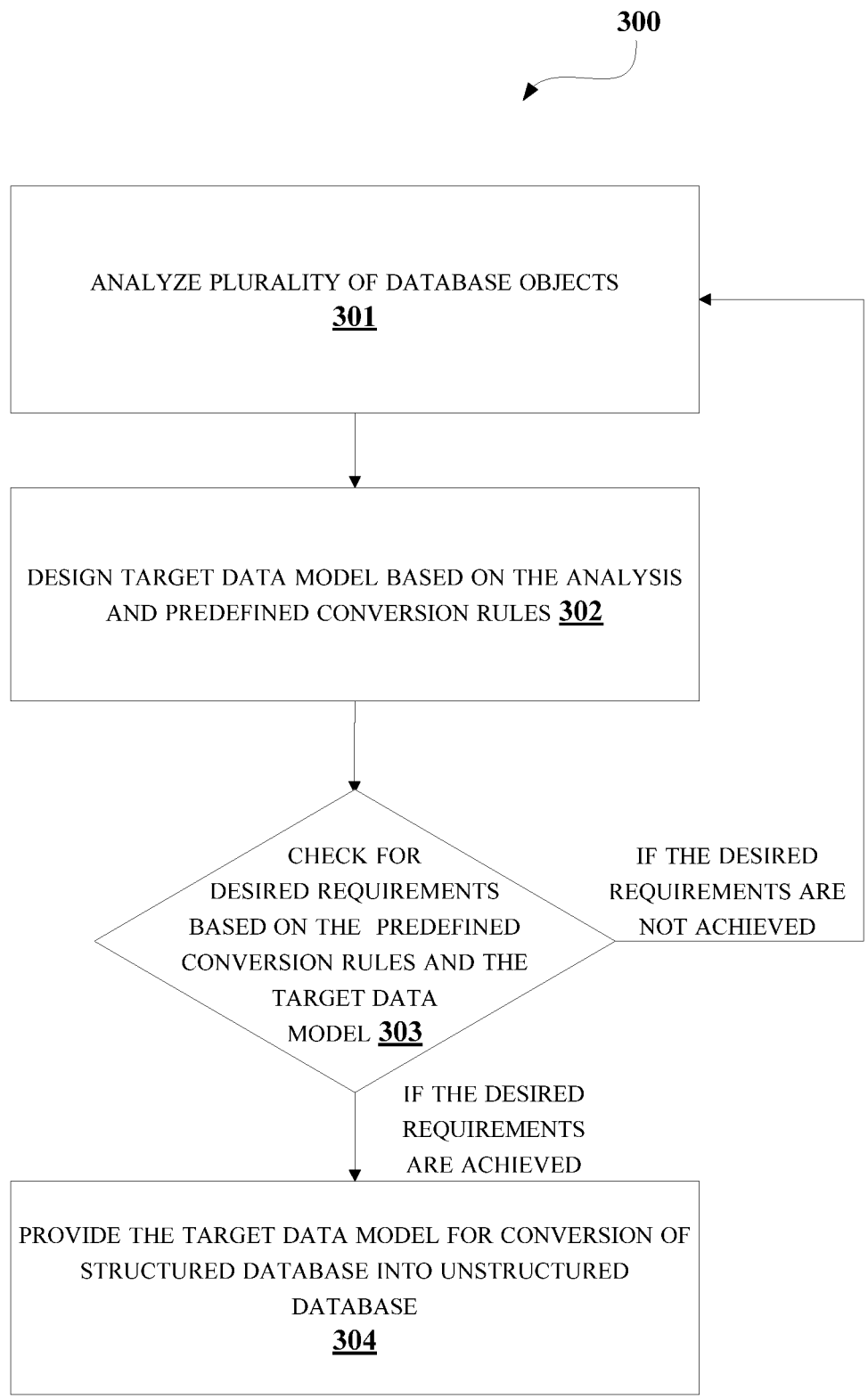
FIG. 3 illustrates a flowchart showing an exemplary method for generation of optimized target data model in accordance with some embodiments of present disclosure.

Upon extracting the plurality of database objects from the one or more fields, the target data model 210 is generated by the target data model generation module 202 based on at least one of the plurality of database objects and the set of predefined conversion rules 211. In an embodiment, the target data model 210 may be generated based on the one or more data fields directly. The target data model 210 is generated without changing business logic of the bank entity. The predefined conversion rules 211 are set of rules which may be used for generating the target data model 210 without changing the business logic. For example, the predefined conversion rules for converting the structured database 208 illustrated in Table 3 to the unstructured database 215 illustrated in Table 4 may be that, the data objects associated with the data field 'MARRIED' should be of a Boolean data type. One or more techniques known to a person skilled in the art may be implemented for generating the target data model. However, the present disclosure discloses to provide an optimized target data model. An exemplary method for the generation of the optimized target data model 210 is illustrated in FIG. 3.

At block 301, the target data model generation module 202 analyzes the plurality of database objects. One or more techniques to a person skilled in art may be implemented for analyzing the plurality of database objects. In an embodiment, the analysis of the plurality of database may be in relation to the target data model 210. Based on the analysis, the target data model generation module 202 may predict type of conversion to be performed by the database conversion system 101. The type of the conversion may be character data type to Boolean data type.

At step 302, the target data model generation module 202, based on the predefined conversion rules 211 and the analysis of the plurality of database objects, designs a target data model 210. In a non-limiting embodiment, designing of the target data model includes estimating and planning of the target data model 210 based on the plurality of the database objects and the predefined conversion rules 211. In an embodiment, the estimating and the planning may include to determine efforts required by the database conversion system 101 for optimization and modernization of the structured database 208. One or more techniques known to a person skilled in the art may be implemented for the estimation and the planning.

At block 303, the target data model generation module 202 performs check for desired requirements as per the requirements of the unstructured database based on the predefined conversion rules 211 and the target data model 210. In an embodiment, the desired requirements may be obtained based on analysis of previous database conversions performed by the database conversion system 101. In a non-limiting embodiment, the check for desired requirements may be a verification performed by comparing the generated target data model 210 with the predefined conversion rules 211. The verification may be performed by the data architect associated with the database conversion system 101. If the desired requirements are not achieved, step in block 301 is performed. Thereby, the plurality of data objects is re-analyzed and the target data model 210 is re-designed, until the desired requirements is achieved. If the desired requirement is achieved, step in block 304 is performed.

At block 304, when the desired requirements are achieved, the generated target data model 210 is provided for the conversion of the structured database 208 into unstructured database 215 by the target data model generation module 202.

By the illustrated method 300, updating of the generated target data model 210 until a desired requirement is achieved and an optimize target data model 210 may be obtained for conversion.

Further, the Blockchain 212 is generated by the Blockchain generation module 203, where each of the Blockchain comprises the one or more blocks corresponding to each of the one or more financial transactions of the structured database 208. Each of the one or more blocks comprise at least the database object from the plurality of database objects of the structured database 208. The one or more blocks may be generated for corresponding one or more financial transactions that occur within a pre-determined time interval.

Further, the conversion module 204 performs the conversion of the plurality of database objects of the structured database 208 into the one or more data fields of the unstructured database 215 based on the optimized target data model 210. In an embodiment, the plurality of database objects extracted from the one or more data fields of the structured database 208 are file-based data type and are stored in the one or more data fields of the unstructured database 215 for the conversion. In an embodiment, the conversion may be performed using a Cobol based module, by which the plurality of database objects of the structured database 208 is converted to match with the plurality of database objects of the unstructured database 215.

In an embodiment, when the conversion module 204 detects the conversion is not required, the conversion module 204 writes to the target data model 210 and updates the target data model 210.

Upon the conversion, the notification generation module 205 is further configured to generate the notification 214 corresponding to the one or more data fields of the unstructured database 215, the notification 214 is associated with the one or more discrepancies 213 corresponding to the financial transaction. The one or more discrepancies 213 may be identified based on one or more pre-defined transaction patterns. In an embodiment, the one or more pre-defined transaction patterns are generated based on analysis of historic financial transaction data. The historic financial transaction data comprises past financial transactions in the structured database 208. The database conversion system 101 is configured to analyze the historic transaction data and generate the one or more predefined transaction patterns based on the analysis. In an embodiment, one or more techniques known to a person skilled in art may be implemented for generating the one or more predefined transaction patterns.

Consider the predefined time interval to be monthly, and the one or more blocks are January, February and march, the unstructured database 215 may be as illustrated in Table 5 below.

TABLE 5

| Month | Date | Transaction | Credit amount |
|---|---|---|---|
| JANUARY | 2 Jan. 2016 | CVS | 400 |
| | 9 Jan. 2016 | WALMART | 500 |
| | 15 Jan. 2016 | WALGREEN | 300 |

TABLE 5-continued

| Month | Date | Transaction | Credit amount |
|---|---|---|---|
| FEBRUARY | 10 Feb. 2016 | CVS | 100 |
| | 25 Feb. 2016 | CVS | 500 |
| MARCH | 1 Mar. 2016 | WALGREEN | 50 |
| | 2 Mar. 2016 | AMAZON ONLINE | 9000 |
| | 10 Mar. 2016 | WALMART | 500 |
| | 15 Mar. 2016 | CVS | 600 |

Based on the one or more predefined transaction patterns, the data conversion system 101 may identify the credit amount of 9000 in block of March (italicized in the Table 6 below) month to be unusual and notify the credit amount 9000 to be discrepancy. In an embodiment, the notification 214 comprises highlighting the one or more data fields associated with the one or more discrepancies 213 in the unstructured database 215 as illustrated in Table 6 below.

TABLE 6

| Month | Date | Transaction | Credit amount |
|---|---|---|---|
| JANUARY | Jan. 2, 2016 | CVS | 400 |
| | Jan. 9, 2016 | WALMART | 500 |
| | Jan. 15, 2016 | WALGREEN | 300 |
| FEBRUARY | Feb. 10, 2016 | CVS | 100 |
| | Feb. 25, 2016 | CVS | 500 |
| MARCH | Mar. 1, 2016 | WALGREEN | 50 |
| | Mar. 2, 2016 | AMAZON ONLINE | 9000 |
| | Mar. 10, 2016 | WALMART | 500 |
| | Mar. 15, 2016 | CVS | 600 |

The other data 216 may store data, including temporary data and temporary files, generated by modules for performing the various functions of the database conversion system 101. The one or more modules 106 may also include one or more other modules 206 to perform various miscellaneous functionalities of the database conversion system 101. It will be appreciated that such modules may be represented as a single module or a combination of different modules.

Figure 4:
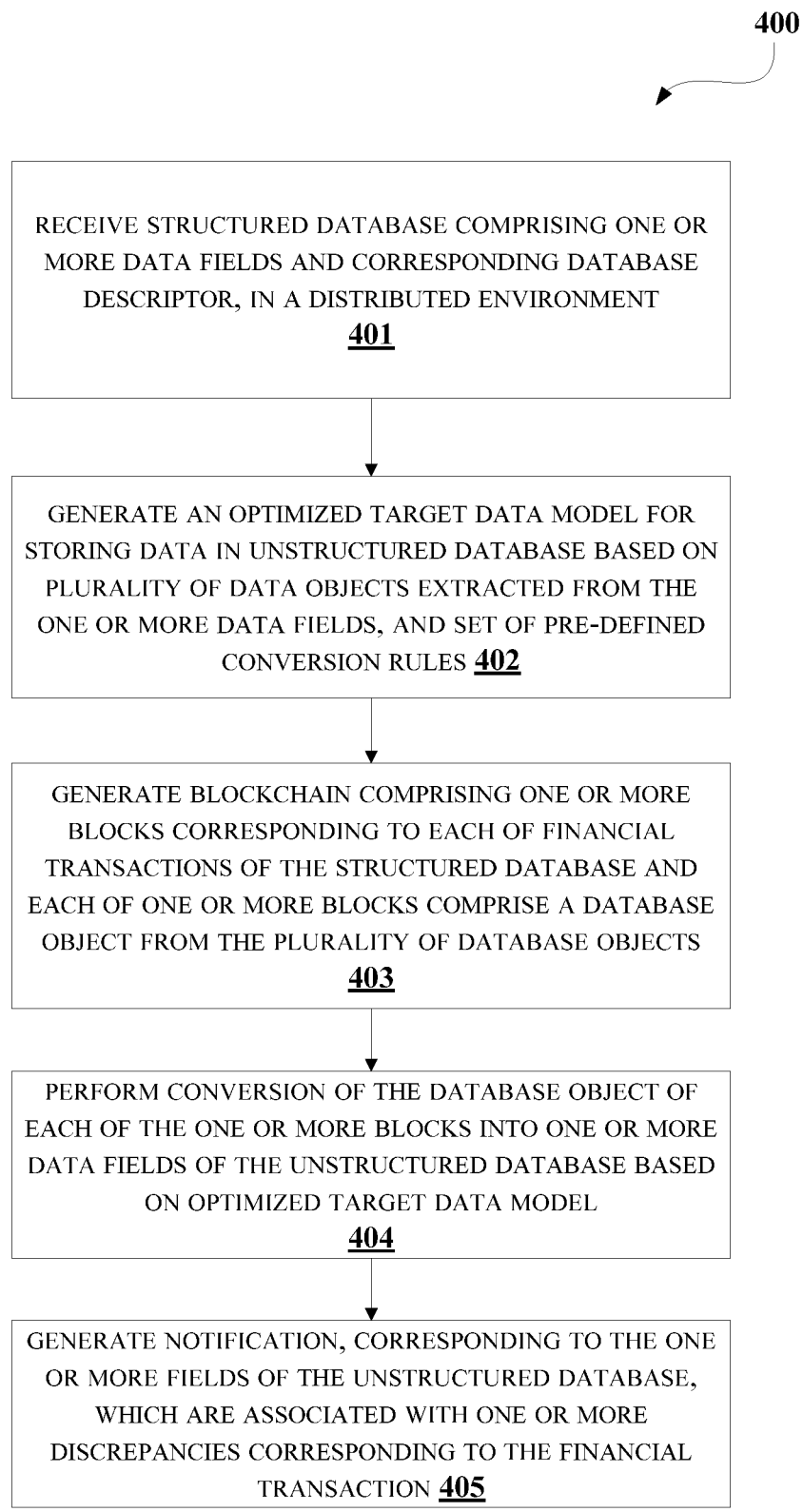
FIG. 4 illustrates a flowchart showing a method for conversion of a structured database into an unstructured database in accordance with some embodiments of present disclosure.

FIG. 4 illustrates a flowchart showing the method for conversion of the structured database 208 into the unstructured database 215 in accordance with some embodiments of present disclosure.

At block 401, the retrieving module 201 retrieves, in the distributed environment, the structured database 208 and the corresponding database descriptor 209. The structured database 208 comprises the one or more data fields, and each of the one or more data fields corresponds to the financial transaction from the one or more financial transactions associated with the structured database 208.

At block 402, the target data model generation module 202 generates the optimized target data model 210 for storing data in the unstructured database 215. The generation is based on at least one of the plurality of database objects extracted from the one or more data fields of the structured database 208 and set of pre-defined conversion rules 211.

At block 403, the Blockchain generation module 203 generates the Blockchain 212 comprising the one or more blocks corresponding to each financial transaction of the structured database 208. Each of the one or more blocks comprise at least a database object from the plurality of database objects extracted from the one or more data fields of the structured database 208.

At block 404, the conversion module 204 performs conversion of the database object in each of the one or more blocks into the one or more data fields of the unstructured database 215. The conversion is based on the optimized target data model 210.

At block 405, the notification generation module 205 generates the notification 214 corresponding to the one or more data fields of the unstructured database 215, which are associated with the one or more discrepancies 213 corresponding to the financial transaction.

In an embodiment, when two or more operational processes from the plurality of operational processes may be associated with the score greater than predefined score threshold value, then operational processes from the two or more operational process may be identified based on highest value of the score.

As illustrated in FIGS. 3 and 4, the methods 300 and 400 may include one or more blocks for executing processes in the database conversion system 101. The methods 300 and 400 may be described in the general context of computer executable instructions. Generally, computer executable instructions can include routines, programs, objects, components, data structures, procedures, modules, and functions, which perform particular functions or implement particular abstract data types.

The order in which the methods 300 and 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 5:
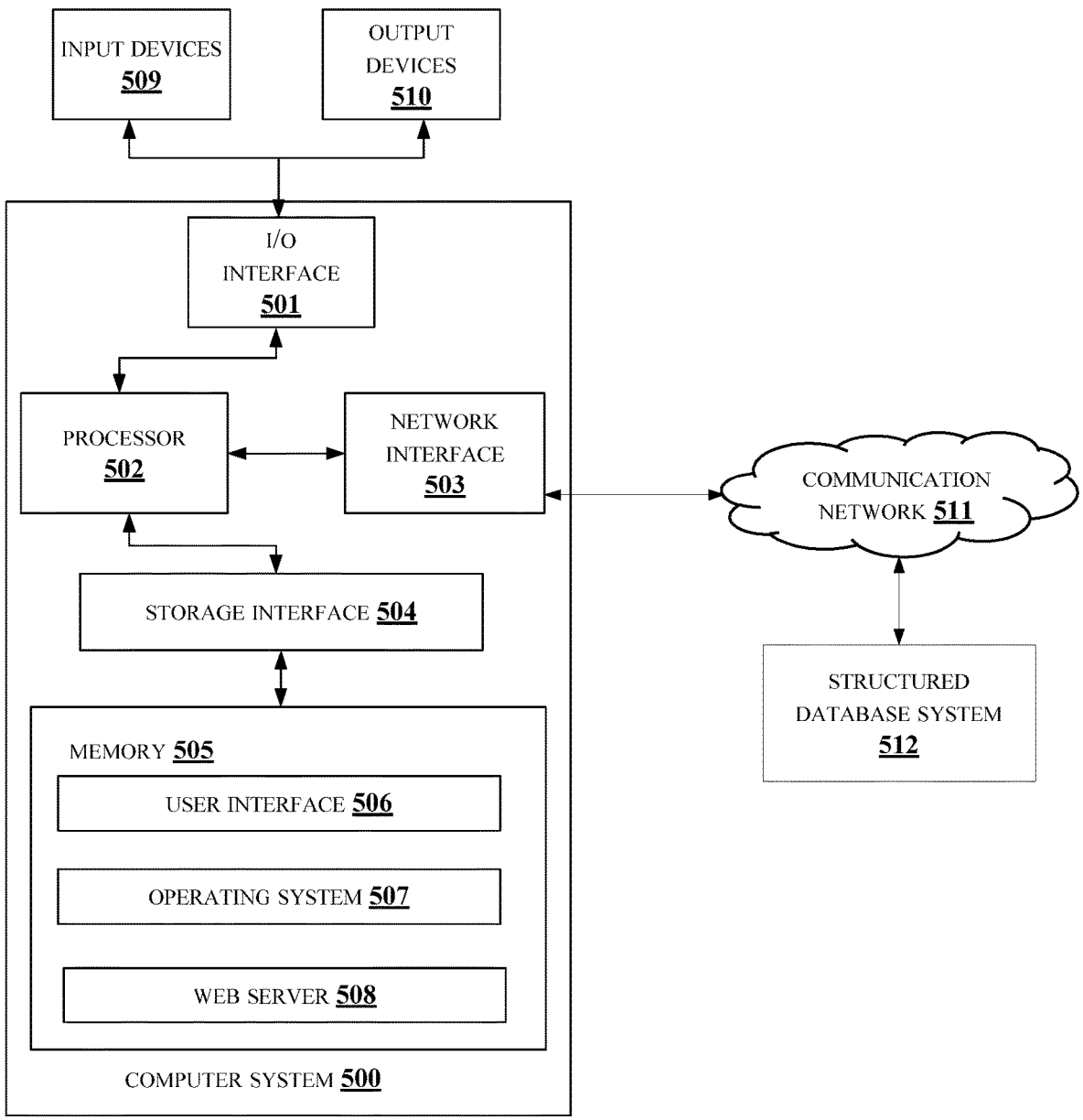
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the database conversion system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of the database conversion system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with a structured database system 512 for conversion of the structured database 208 to unstructured database 215. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions to obtain optimized and efficient target data model during conversion of legacy database.

An embodiment of the present disclosure provisions to reduce cost of resource and storage associated with modernization of the legacy systems.

An embodiment of the present disclosure provides a faster way of addressing discrepancies in financial transactions and helps to track down an unauthorized transaction which enhances support system to customers.

An embodiment of the present disclosure allows database conversion in a customized format.

An embodiment of the present disclosure implements Blockchain technique which facilitates a secure system for conversion of databases.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for conversion of a structured database into an unstructured database, comprising:
retrieving, by a database conversion system, in a distributed environment, structured database and a corresponding database descriptor, wherein the structured database comprises one or more data fields, and wherein each of the one or more data fields corresponds to a financial transaction from one or more financial transactions;
generating, by the database conversion system, an optimized target data model for storing data in the unstructured database, wherein the generation is based on at least one of a plurality of database objects extracted from one or more data fields of the structured database, and a set of pre-defined conversion rules;
generating, by the database conversion system, a Blockchain comprising one or more blocks corresponding to each of the one or more financial transactions of the structured database, wherein each of the one or more blocks comprise at least a database object from the plurality of database objects;
performing, by the database conversion system, conversion of the database object of each of the one or more blocks into one or more data fields of the unstructured database, based on the optimized target data model; and
generating, by the database conversion system, a notification corresponding to the one or more data fields of the unstructured database, which are associated with one or more discrepancies corresponding to the financial transaction.

2. The method as claimed in claim 1, wherein the structured database comprises:
a Virtual Storage Access Method (VSAM) database, hierarchical database comprising an Information Management System (IMS), network database comprising an Integrated Database Management System (IDMS), or a relational database comprising Database 2 (DB2).

3. The method as claimed in claim 1, wherein the one or more discrepancies are identified based on one or more pre-defined transaction patterns.

4. The method as claimed in claim 3, wherein the one or more pre-defined transaction patterns are generated based on analysis of historic financial transaction data.

5. The method as claimed in claim 1, wherein each of the one or more blocks are generated for corresponding one or more financial transactions that occur within a pre-determined time interval.

6. The method of claim 1, wherein the plurality of database objects is extracted based on parsing of the one or more data fields.

7. The method of claim 1, wherein the notification comprises highlighting the one or more data fields associated with the one or more discrepancies in the unstructured database.

8. A database conversion system to conversion of a structured database into an unstructured database, comprises:
a processor; and
a memory communicatively coupled to the processor, wherein the memory stores processor-executable instructions, which, on execution, cause the processor to:
retrieve in a distributed environment, structured database and a corresponding database descriptor, wherein the structured database comprises one or more data fields, and wherein each of the one or more data fields corresponds to a financial transaction from one or more financial transactions;
generate an optimized target data model for storing data in the unstructured database, wherein the generation is based on at least one of a plurality of database objects extracted from one or more data fields of the structured database, and a set of pre-defined conversion rules;
generate a Blockchain comprising one or more blocks corresponding to each of the one or more financial transactions of the structured database, wherein each of the one or more blocks comprise at least a database object from the plurality of database objects;
perform conversion of the database object of each of the one or more blocks, into one or more data fields of the unstructured database, based on the optimized target data model; and
generate a notification corresponding to the one or more data fields of the unstructured database, which are associated with one or more discrepancies corresponding to the financial transaction.

9. The database conversion system as claimed in claim 8, wherein the structured database comprises:
a Virtual Storage Access Method (VSAM) database, hierarchical database comprising an Information Management System (IMS), network database comprising an Integrated Database Management System (IDMS), or a relational database comprising Database 2 (DB2).

10. The database conversion system as claimed in claim 8, wherein the processor is configured to identify one or more discrepancies based on one or more pre-defined transaction patterns.

11. The database conversion system as claimed in claim 10 wherein the one or more pre-defined transaction patterns are generated based on analysis of historic financial transaction data.

12. The database conversion system as claimed in claim 8, wherein the processor is configured to generate the one or more blocks corresponding to one or more financial transactions that occur within a pre-determined time interval.

13. The database conversion system as claimed in claim 8, wherein the processor is configured to extract the plurality of database objects based on parsing of the one or more data fields.

14. The database conversion system as claimed in claim 8, wherein the notification comprises highlighting the one or more data fields associated with the one or more discrepancies in the unstructured database.

15. A non-transitory computer readable medium including instructions stored thereon that when processed by at least one processor cause a device to perform operations comprising:
retrieving in a distributed environment, structured database and a corresponding database descriptor, wherein the structured database comprises one or more data fields, and wherein each of the one or more data fields corresponds to a financial transaction from one or more financial transactions;
generating an optimized target data model for storing data in the unstructured database, wherein the generation is based on at least one of a plurality of database objects extracted from one or more data fields of the structured database, and a set of pre-defined conversion rules;

generating a Blockchain comprising one or more blocks corresponding to each of the one or more financial transactions of the structured database, wherein each of the one or more blocks comprise at least a database object from the plurality of database objects;

performing conversion of the database object of each of the one or more blocks into one or more data fields of the unstructured database, based on the optimized target data model; and generating a notification corresponding to the one or more data fields of the unstructured database, which are associated with one or more discrepancies corresponding to the financial transaction.

16. The medium as claimed in claim 15, wherein the structured database comprises:
a Virtual Storage Access Method (VSAM) database, hierarchical database comprising an Information Management System (IMS), network database comprising an Integrated Database Management System (IDMS), or a relational database comprising Database 2 (DB2).

17. The medium as claimed in claim 15, wherein the one or more discrepancies are identified based on one or more pre-defined transaction patterns.

18. The medium as claimed in claim 17, wherein the one or more pre-defined transaction patterns are generated based on analysis of historic financial transaction data.

19. The medium as claimed in claim 15, wherein each of the one or more blocks are generated for corresponding one or more financial transactions that occur within a pre-determined time interval.

20. The medium as claimed in claim 15, wherein the plurality of database objects is extracted based on parsing of the one or more data fields.

21. The medium as claimed in claim 15, wherein the notification comprises highlighting the one or more data fields associated with the one or more discrepancies in the unstructured database.

* * * * *